(12) United States Patent
Scoggins et al.

(10) Patent No.: US 11,726,503 B2
(45) Date of Patent: Aug. 15, 2023

(54) TWO-PHASE DEVICE SHUTOFF FOR A DEVICE WITH A SENSOR COUPLED TO AN INTEGRAL SHUTOFF SYSTEM

(71) Applicant: Honeywell International Inc., Morris Plains, NJ (US)

(72) Inventors: Sean M. Scoggins, Rolesville, NC (US); Lakshmi Viswanathan Krishnan, Raleigh, NC (US); Markus Boelter, Lingen (DE); Christof Hermann Esselmann, Nordwalde (DE); Prasad Samudrala, Bangalore (IN); Murali Krishna Bezawada, Hyderabad (IN); Gerald John Paprocki, Cary, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/191,959

(22) Filed: Mar. 4, 2021

(65) Prior Publication Data
US 2022/0004208 A1 Jan. 6, 2022

Related U.S. Application Data

(60) Provisional application No. 62/705,515, filed on Jul. 1, 2020.

(51) Int. Cl.
*G05D 7/06* (2006.01)
*H04L 67/12* (2022.01)

(52) U.S. Cl.
CPC ............ *G05D 7/0623* (2013.01); *H04L 67/12* (2013.01)

(58) Field of Classification Search
CPC .............................. G05D 7/0623; H04L 67/12
See application file for complete search history.

(56) References Cited

U.S. PATENT DOCUMENTS

| | | | |
|---|---|---|---|
| 5,960,807 A | 10/1999 | Reyman | |
| 5,964,811 A * | 10/1999 | Ishii | ..................... F02D 41/266 |
| | | | 701/33.9 |
| 7,228,726 B2 | 6/2007 | Kates | |
| 7,295,934 B2 | 11/2007 | Hairston | |

(Continued)

FOREIGN PATENT DOCUMENTS

| | | | |
|---|---|---|---|
| JP | H11108729 A | * | 4/1999 |
| JP | 2007149496 A | * | 6/2007 |

*Primary Examiner* — Mohamed Barakat
*Assistant Examiner* — Rufus C Point
(74) *Attorney, Agent, or Firm* — John Maldjian; Stevens & Lee PC

(57) ABSTRACT

An implementation is for a two-phase shutoff of a device having a sensor coupled to an integral shutoff system. One example includes a metering system with a sensor coupled to an integral shutoff system, wherein the sensor is used to perform a measurement which indicates that a first threshold has been met, a first response system configured to perform at least one action with respect to receiving the indication that the first threshold was met, the at least one action occurring while the integral shutoff system remains inactivated, a second response system configured to receive an indication from the metering system, wherein the sensor is used to perform a second measurement which indicates that a second threshold has been met, and a second response system configured to perform at least one additional action.

20 Claims, 6 Drawing Sheets

(56) References Cited

U.S. PATENT DOCUMENTS

| | | | |
|---|---|---|---|
| 8,843,241 B2 | 9/2014 | Saberi et al. | |
| 2001/0048030 A1* | 12/2001 | Sharood | H02J 13/00018 |
| | | | 236/49.3 |
| 2008/0096057 A1* | 4/2008 | Bono | H01M 8/04425 |
| | | | 429/513 |
| 2012/0036250 A1* | 2/2012 | Vaswani | G01D 4/004 |
| | | | 709/224 |
| 2016/0312687 A1* | 10/2016 | Kemmerling | F02B 37/18 |
| 2017/0260916 A1* | 9/2017 | Kraemer | F02B 75/20 |
| 2020/0064872 A1* | 2/2020 | Peace | G05D 16/2086 |

\* cited by examiner

TWO-PHASE DEVICE SHUTOFF FOR A DEVICE WITH A SENSOR COUPLED TO AN INTEGRAL SHUTOFF SYSTEM

CROSS-REFERENCE TO RELATED APPLICATION

This application claims the benefit of U.S. Provisional Application Ser. No. 62/705,515 filed Jul. 1, 2020, entitled "TWO-PHASE DEVICE SHUTOFF FOR A DEVICE WITH A SENSOR COUPLED TO AN INTEGRAL SHUTOFF SYSTEM", which is incorporated herein by reference in its entirety.

BACKGROUND

Many devices that are deployed in computer networks control systems that could present safety risks to people and the economy, if not controlled effectively. For example, gas utilities must protect the physical gas supply lines using devices that are capable of shutting off the gas supply if there is a potential risk, such as an explosion or a fire. Remotely sensing pressure throughout a distribution network is required, in order to maintain real-time situational awareness of distribution pressures. Remotely actuating controllers to shut off gas flow in dangerous situations is also required in order to quickly disrupt dangerous overpressure conditions at usage points, and this is what is commonly done by utilities. There are also other examples of devices such as electrical meters and others, which are also controlled by computer networks and because of safety, are handled in a similar manner.

In the example of the gas supply system, disrupting the gas supply is expensive. In many cases, a human operator must go to the site, inspect the conditions, and re-activate the system manually, if it's safe. Revenue gas meters can provide end of line monitoring of pressure and gas shutoff capabilities. These types of devices, however, are battery powered so it is critical to balance the need for real-time monitoring and responsive control with the need to extend the useful life of the device before the battery is discharged. Thus, this device must remain communicative in the field on a single non-rechargeable battery for a long period of time, yet still continually monitor a safety condition indefinitely.

Threshold-based automatic shutoff functionality in gas meters means having an a priori threshold established. When the threshold is met, software, firmware, and/or hardware will automatically shut off the gas supply by shutting a valve. These thresholds need to be universally appropriate, potentially across a multitude of connected devices. This is often difficult as the difference between normal and abnormal pressure is not always obvious. A threshold too high does not provide enough safety risk reduction. A threshold too low incurs too much cost from service reconnects required when it activates during "normal" or expected conditions.

SUMMARY

Two-phase shutoff of a device having a sensor coupled to an integral shutoff system is described. One implementation is a two-phase shutoff system, which includes a metering system with a sensor coupled to an integral shutoff system, wherein the sensor is used to perform a measurement which indicates that a first threshold has been met, a first response system configured to perform at least one action with respect to receiving the indication that the first threshold was met, the at least one action occurring while the integral shutoff system remains inactivated, a second response system configured to receive an indication from the metering system, wherein the sensor is used to perform a second measurement which indicates that a second threshold has been met, and a second response system configured to perform at least one additional action, wherein the at least one additional action includes activating the integral shutoff system.

In another implementation, one or more hardware-based non-transitory memory devices store computer-readable instructions which, when executed by the one or more processors disposed in a computing device, cause the computing device to receive an indication from a first network of devices, wherein at least one sensor in the network of devices performed a measurement and indicated that a first threshold has been met, the network of devices including at least one first integral shutoff system, receive an indication from a second network of devices, wherein at least one second sensor in the second network of devices performed a second measurement and indicated that a second threshold has been met, the second network of devices including at least one second integral shutoff system, perform at least one action with respect to the first and second networks, the at least one action occurring while the first and second integral shutoff system remains inactivated, the at least one first and second sensors are different sensors and the first and second measurements are different types of measurements, receive a subsequent indication from the first network of devices, wherein the at least one sensor is used to perform a subsequent measurement and indicated that an additional threshold has been met, the additional threshold being associated with the first threshold, and receive a subsequent indication from the second network of devices, wherein the at least one second sensor is used to perform a subsequent second measurement and indicated that a second additional threshold has been met, the second additional threshold being associated with the second threshold, and perform at least one additional action with respect to the first and second network of devices, wherein the at least one additional action includes activating one or more of the first integral shutoff system and the second integral shutoff system.

Another example implementation is a method that receives an indication from the device, wherein the sensor is used to perform a measurement in the device which indicates that a first threshold has been met, performs at least one action with respect to receiving the indication that the first threshold was met, the at least one action requiring the integral shutoff system to remain inactivated, receives an indication from the device, wherein the sensor is used to perform a second measurement in the device which indicates that a second threshold has been met, and performs at least one additional action, wherein the at least one additional action includes activating the integral shutoff system of the device.

DETAILED DESCRIPTION OF THE INVENTION

Figure 1:
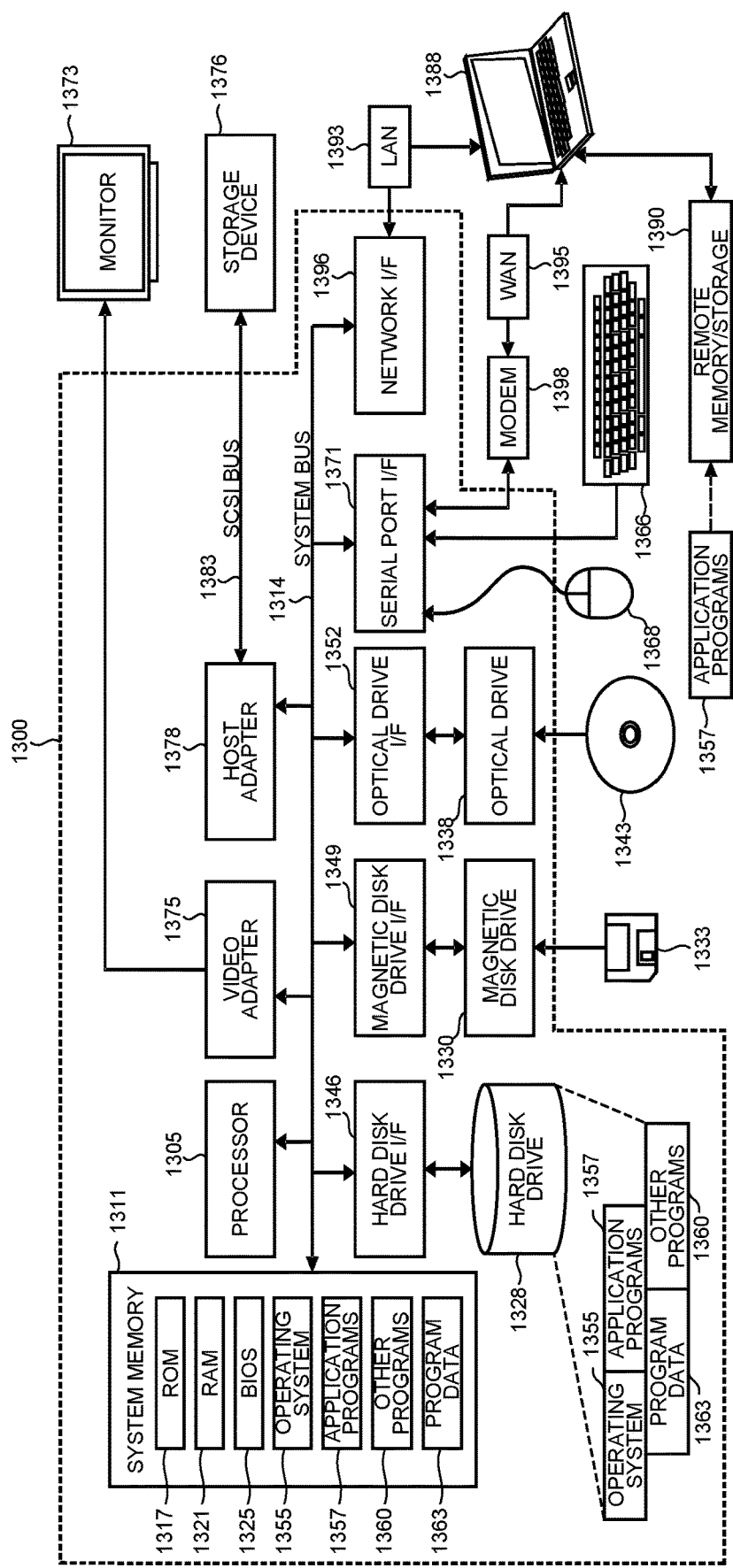
FIG. 1 is a simplified block diagram of a two-phase shutoff of a device having a sensor coupled to an integral shutoff system.

FIG. 1 is a simplified block diagram of an illustrative architecture of a two-phase shutoff of a device having a sensor coupled to an integral shutoff system. In one example, the computer system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random-access memory (RAM) 1321. A basic input/output system (BIOS) 1325, containing the basic routines that help to transfer information between elements within the computer system 1300, such as during startup, is stored in ROM 1317.

The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300.

Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present use of a two-phase shutoff of a device having a sensor coupled to an integral shutoff system. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1333, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 1 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 1. The logical connections depicted in FIG. 1 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted that the network connections shown in FIG. 1 are illustrative and other means of establishing a communications link between the computers may be used depending on the specific requirements of an application of the present use of a two-phase shutoff of a device having a sensor coupled to an integral shutoff system.

Figure 2:
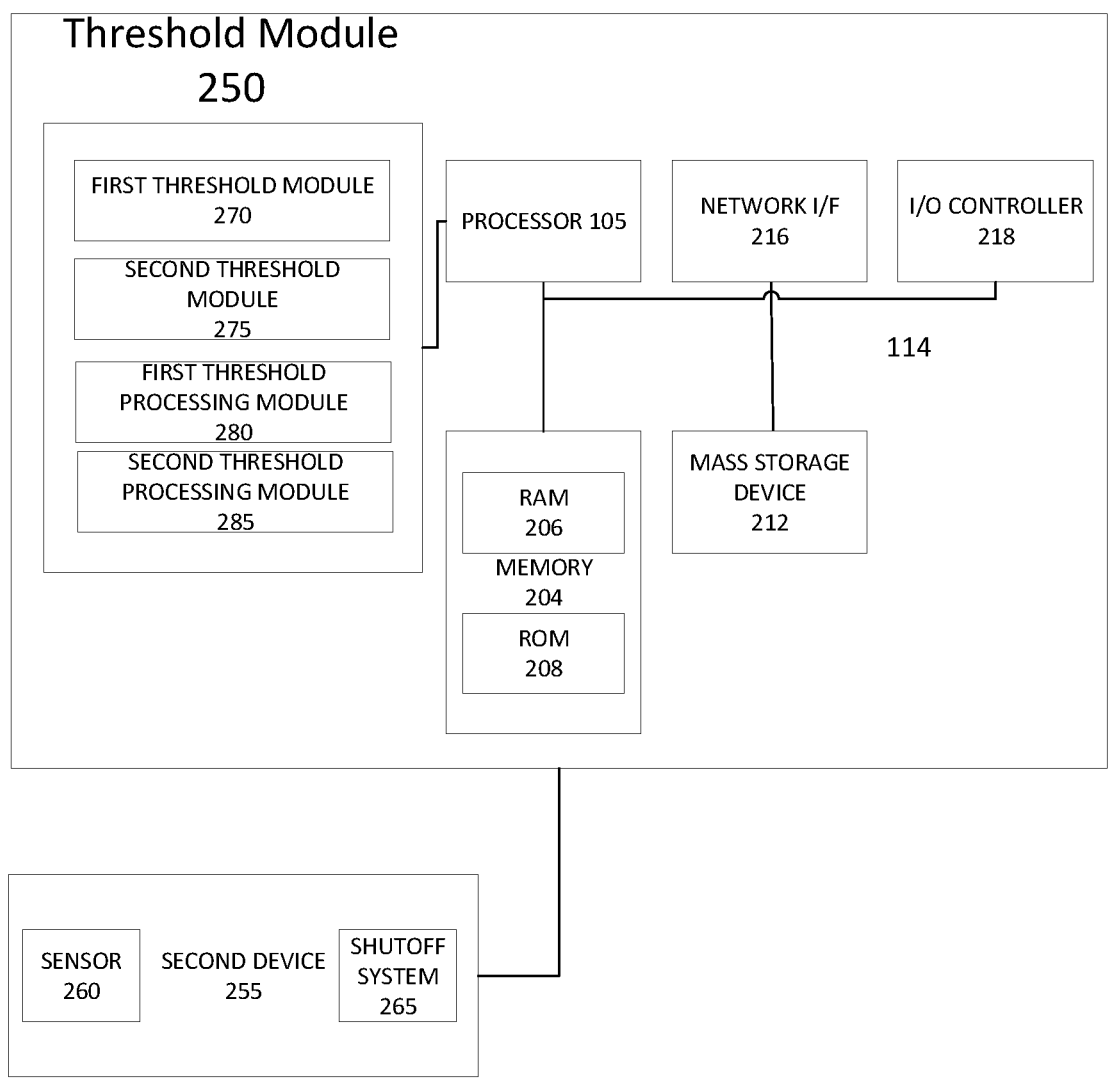
FIG. 2 shows an illustrative architecture of a two-phase shutoff of the device.

FIG. 2 shows an illustrative architecture for a computing device for the present use of a two-phase shutoff of a device having a sensor coupled to an integral shutoff system. In one example, the architecture can be for an electronic device 100, such as a gas or electrical utility head-end system, a server, or any other general purpose computing system (hereinafter "electronic device"). At least one second device 255 with a sensor 260 and a shutoff system 265 is coupled to the electronic device 100 via network connection 270. For simplicity, FIG. 2 is described with respect so second device 255, but it is understood to someone skilled in the art that the device 100 can control a plurality of second devices as well.

One example of the second device 255 is a natural gas meter for a gas utility. A gas meter is typically battery operated and in one implementation has a valve upstream with a solenoid. In this implementation, the second device 255 is capable of activating the solenoid and shutting the valve via the shutoff system 265. The sensor 260 can be used to detect pressure in the line caused by the gas. Alternatively, the second device 255 can be other types of meters, electrically powered and others, so long as they use a sensor that enables a determination as to whether to shutoff of the device.

The device 100 illustrated in FIG. 2 includes one or more processors 105 (e.g., central processing unit, dedicated Artificial Intelligence chip, graphics processing unit, etc.), a system memory 204, including RAM (random access memory) 206 and ROM (read only memory) 208, and a system bus 114 that operatively and functionally couples the components in the device 100. A basic input/output system containing the basic routines that help to transfer information between elements within the device 100, such as during startup, is typically stored in the ROM 208. The device 100 further includes a mass storage device 212 for storing software code or other computer-executed code that is utilized to implement applications, the file system, and the operating system. The mass storage device 212 is connected to the processor 105 through a mass storage controller (not shown) connected to the bus 114. The mass storage device 212 and its associated computer-readable storage media provide non-volatile storage for the device 100. Although the description of computer-readable storage media contained herein refers to a mass storage device, such as a hard disk or CD-ROM drive, it may be appreciated by those skilled in the art that computer-readable storage media can be any available storage media that can be accessed by the device 100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray or other optical storage, magnetic cassette, magnetic tape, magnetic disk storage or other magnetic storage device, or any other medium which can be used to store the desired information and which can be accessed by the device 100.

According to various embodiments, the device 100 may operate in a networked environment using logical connections to remote computers through a network. The device 100 may connect to the network through a network interface unit 216 connected to the bus 114. It may be appreciated that the network interface unit 216 also may be utilized to connect to other types of networks and remote computer systems, such as second device 255. The device 100 also may include an input/output controller 218 for receiving and processing input from a number of other devices, including a keyboard, mouse, touchpad, touchscreen, control devices such as buttons and switches or electronic stylus (not shown in FIG. 2). Similarly, the input/output controller 218 may provide output to a display screen, user interface, a printer, or other type of output device (also not shown in FIG. 2).

It may be appreciated that the software components described herein may, when loaded into the processor 105 and executed, transform the processor 105 and the overall device 100 from a general-purpose computing system into a special-purpose computing system customized to facilitate the functionality presented herein. The processor 105 may be constructed from any number of transistors or other discrete circuit elements, which may individually or collectively assume any number of states. More specifically, the processor 105 may operate as a finite-state machine, in response to executable instructions contained within the software modules disclosed herein. These computer-executable instructions may transform the processor 105 by specifying how the processor 105 transitions between states, thereby transforming the transistors or other discrete hardware elements constituting the processor 105.

Processor 105 is coupled to a first threshold module 270 and a second threshold module 275. In one implementation, input/output controller 218 can be utilized by a utility or other head-end operator, for example, to configure the second device 255 using the first and second threshold modules 270 and 275. The first threshold 270 is typically a lower threshold vis a vis the reading of the sensor 260. The second threshold 275 is typically a higher threshold vis a vis the sensor 260. When the sensor 260 of the second device 255 detects a value rising past the first threshold 270 (pressure, for example), it can send an alert notification to the device 100.

In response, device 100 can take various actions including distributing the notification to human operators or other software systems. In one implementation, the device 100 may enrich the alert information with the location of the second device 255, account information, historical readings, or other information. In addition to sending the alert, the second device 255 can enter a mode of much more frequent communication with the device (e.g., wake-up mode). This allows the device 100 to send commands to the second device 255 on an enhanced basis, specifically in systems where the second device 255 is normally in sleep mode to conserve battery life.

In operation, the second device 255 can continue to report the readings of the sensor 260. In one example, the device can receive readings a plurality of second devices that are associated with each other geographically. In this example, the device 100 can generate a geographical visualization or to enable human decision making. The electronic device 100 can also accept input commands (from human users or automated systems) to cancel the wake-up mode, change either of the first or second thresholds in second device 255, or close the shutoff system 265. Alternatively, the device 100 may be caused to activate this "wake up" mode on devices not currently reporting readings beyond the lower threshold, if more information for system operators is needed. If the second device 255 detects a reading of the sensor 260 beyond the second threshold, it will autonomously activate the shutoff system 265.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the electronic device 100 in order to store and execute the software components presented herein. It also may be appreciated that the electronic device 100 may include other types of computing devices, including wearable devices, handheld computers, embedded computer systems, smartphones, PDAs, and other types of computing devices known to those skilled in the art. It is also contemplated that the electronic device 100 may not include all of the components shown in FIG. 2, may include other components that are not explicitly shown in FIG. 2, or may utilize an architecture completely different from that shown in FIG. 2.

Figure 3:
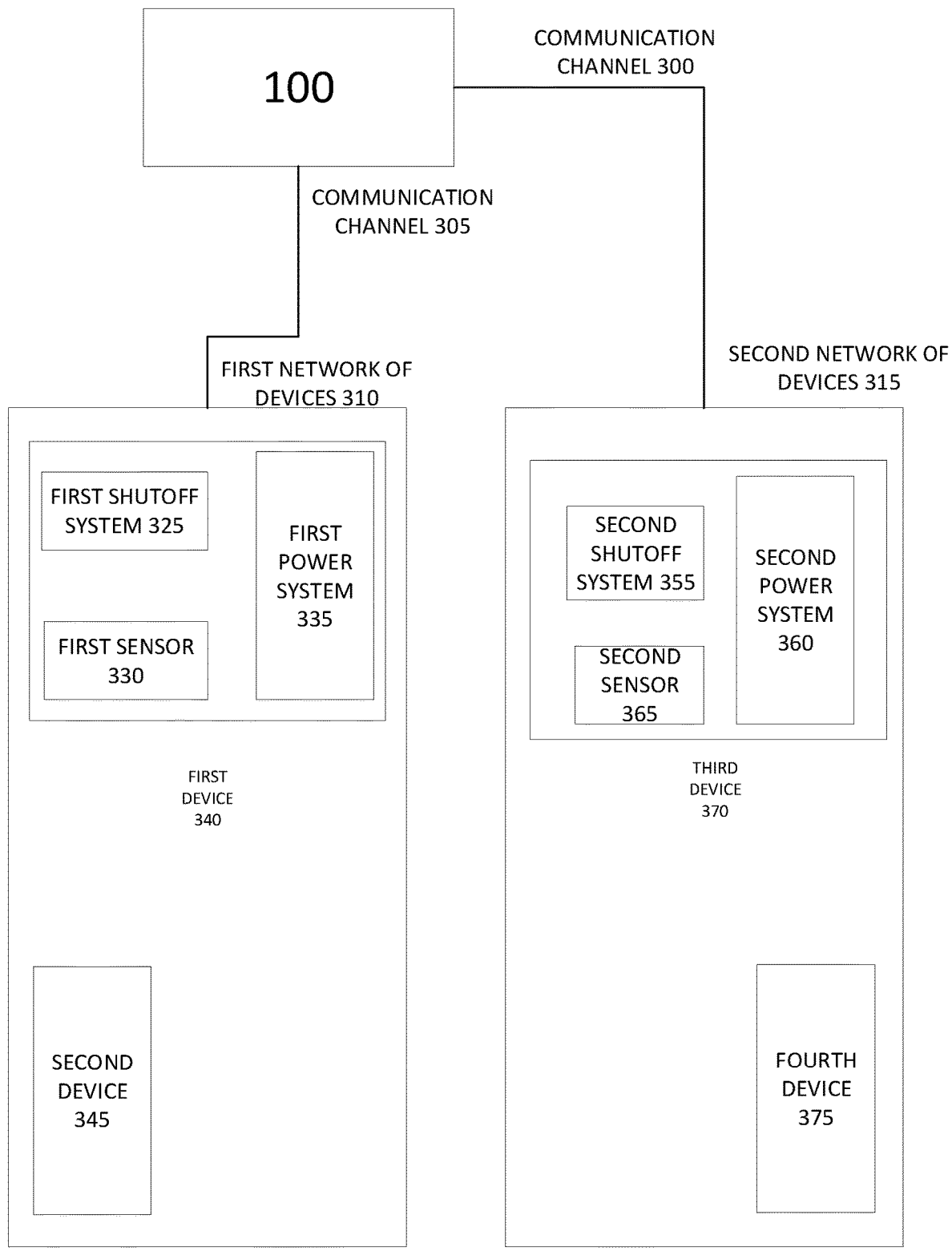
FIG. 3 shows an illustrative architecture of a two-phase shutoff of the device.

FIG. 3 shows an illustrative architecture of a two-phase shutoff of a device having a sensor coupled to an integral shutoff system. In one example, the architecture can be for an electronic device 100, such as a battery powered or electronic power meter. The device 100 illustrated in FIG. 3 includes communication channels 300 and 305 that the device 100 uses for bi-directional communication with a first and second network of devices 310 and 315. The communication channels 300 and 305 are normally operated in a mode that requires a lower level of power consumption (sleep mode) wherein communications between the device 100 and the first and second network of devices 310 and 315 is limited in nature. This is to reduce the need for a high bandwidth channel and also to preserve power in the first and second network of devices 310 and 315, specifically when some or all of the devices are battery powered.

The first and second network of devices 310 and 315 are shown herein as having two devices each although in practice any number of additional devices can be used in either of the first or second network of devices 310 and 315. Specifically, first network of devices 310 has a first device 340 and a second device 345. Second network of devices 315 has a third device 370 and a fourth device 375. More specific detail will now be discussed with respect to the first device 340 and the third device 370, although it should be understood that the second device 345 and the fourth device 375 could have the same or different structure as those described in more detail in FIG. 3.

First device 340 includes a first sensor 330, a first shutoff system 325, and a first power system 335. In this example, the first power system 335 is battery powered and the first sensor is a pressure sensor. This setup is suitable for a gas meter because the nature of the gas contained in the line makes it unsuitable for an electrical power system. Moreover, problems in a gas line may be detected by abnormal pressure readings. The first shutoff system 325 is a solenoid which can open and close a valve, which in turn shuts off the gas flow downstream from the first device 340.

Third device 340 includes a second sensor 365, a second shutoff system 355, and a second power system 360. In this example, second power system 360 is electrical power and first sensor is a current sensor. This setup is suitable for an electrical meter. Problems in an electrical line may be detected by abnormal readings for current or voltage. The first shutoff system 355 is a switch that can stop the flow of electricity, which in turn shuts off the power downstream from the third device 340.

In one example, the device 100 can receive readings from the first and second network of devices 310 and 315. In this example, the device 100 can generate a geographical visualization or to enable human decision making. For example, one geographic visualization might include first and second devices 340 and 345. Another geographic visualization might include third and fourth devices 370 and 375. A human or software-based operator using device 100 can gather additional information about the problem potentially, using the information in the geographic visualization. Namely, the state of one of the devices that did not trigger the lower threshold can be useful in understanding why one of the devices did trigger the lower threshold.

The electronic device 100 can also accept input commands (from human users or automated systems) to cancel the wake-up mode, change either of the first or second thresholds in the first or the second network of devices 310 and 315, or close any of the shutoff systems 325 or 355. Alternatively, the device 100 may be caused to activate this "wake up" mode on devices not currently reporting readings beyond the lower threshold, (second device 345 or fourth device 375 for example) if more information for system operators is needed. If any of the devices in the first or the second network of devices 310 and 315 a reading of the sensor beyond the second threshold, it will autonomously activate the shutoff system.

Figure 4:
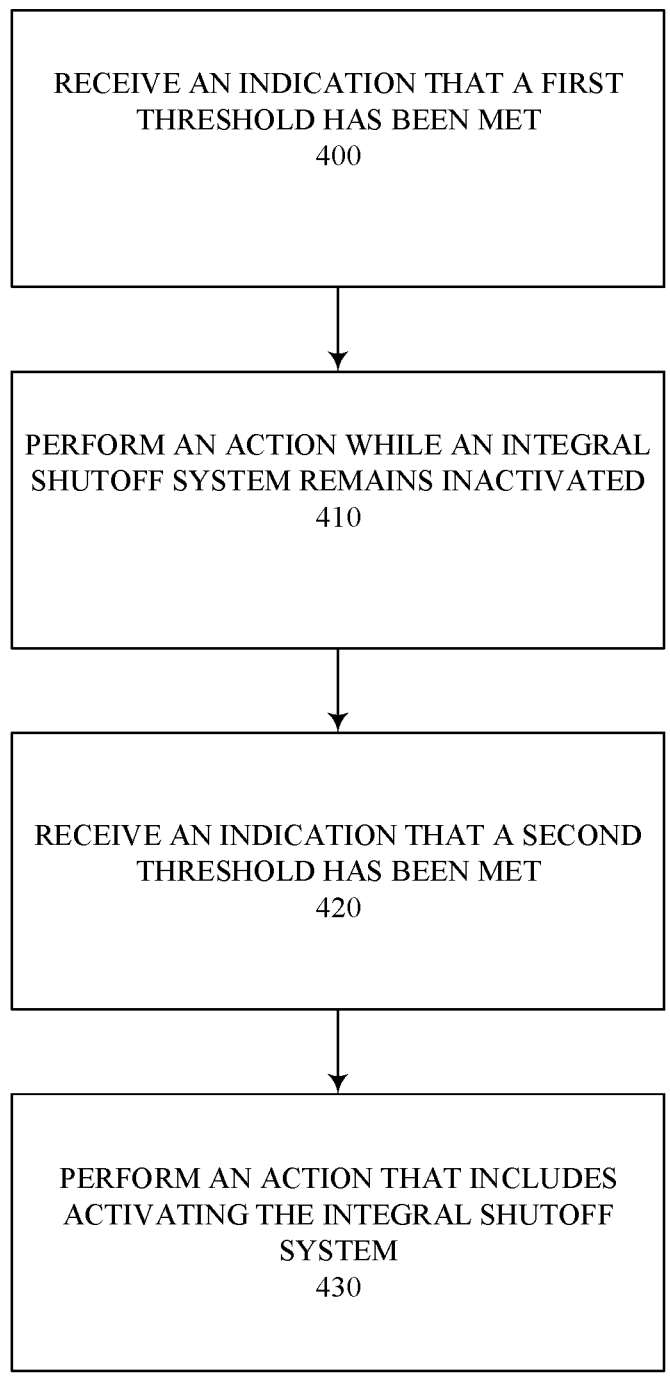
FIG. 4 is a flowchart that illustrates the present use of a two-phase shutoff of the device.

FIG. 4 is a flowchart that illustrates the present use of a two-phase shutoff of a device having a sensor coupled to an integral shutoff system. At step 400, an indication is received that a first threshold has been met. This can be, for example, in a gas meter where a pressure sensor indicates a lower of two thresholds has been met. At step 410, an action is performed while an integral shutoff system remains activated. This allows a human or software-based controller to diagnose and/or correct any abnormality without shutting off the line. This is useful because of the significant cost associated with shutting down a line and then reopening it later. In this example, remedial action is taken while the line continues to operate.

At step 420, an indication is received that a second threshold has been met. This could be, for example, a higher threshold where the need to shut off the line is more urgent (e.g., the gas pressure has become high enough to damage the system). When this happens, an action is performed at step 430. The action includes activating an integral shutoff system, such as a solenoid connected to a valve, downstream of a gas meter.

Figure 5:
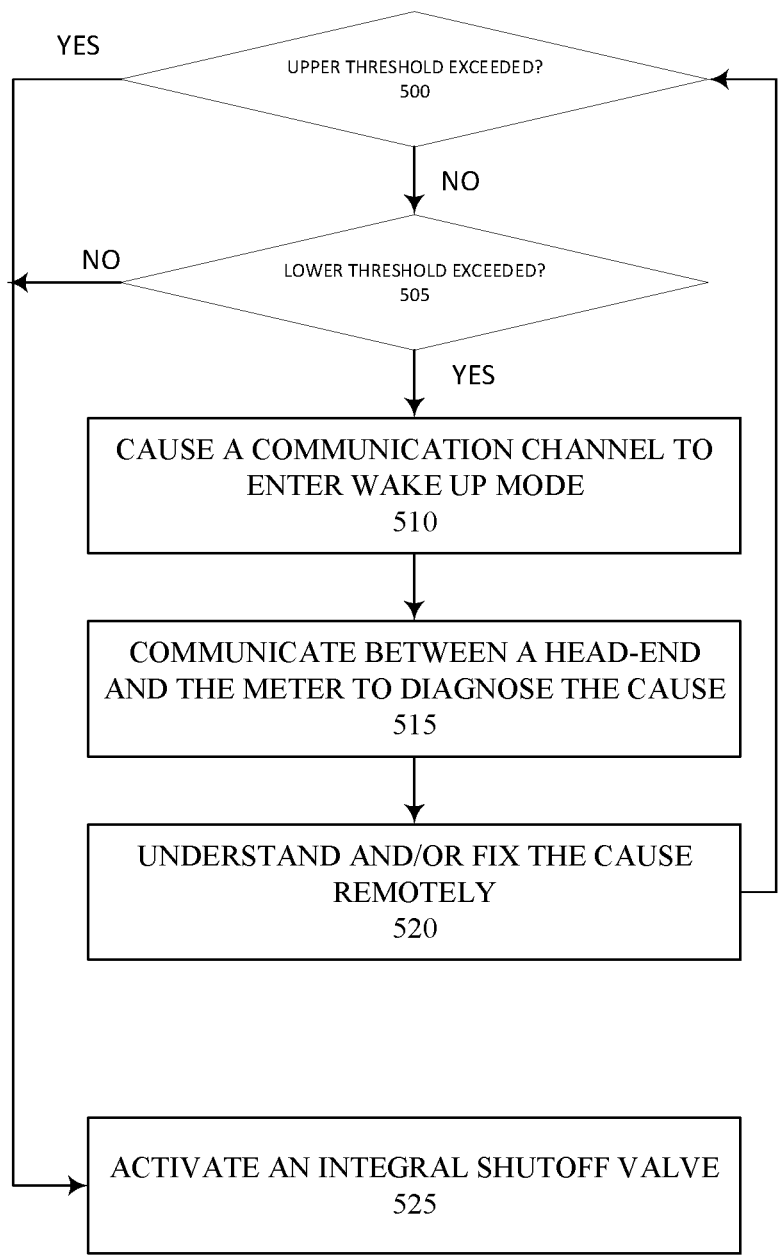
FIG. 5 is a flowchart that illustrates the present use of a two-phase shutoff of the device.

FIG. 5 is a flowchart that illustrates the present use of a two-phase shutoff of a device having a sensor coupled to an integral shutoff system. At step 500, a system determines if an upper threshold is exceeded. This could be, for example, a high pressure reading in a gas line or a high voltage reading in an electrical line. If this threshold is exceeded, an integral shutoff system, such as a valve or a switch, is activated at step 525. To that end, the line is turned off and the cause of this condition won't cause damage (a fire or an explosion, for example) and can remain off until a human operator can inspect the device and/or fix the problem.

Alternatively, if the upper threshold is not exceeded at step 500, the system determines if a lower threshold has been exceeded at step 505. The lower threshold can be used to indicate an abnormality that has the potential to be corrected without human intervention at the site of the meter.

If the lower threshold is not exceeded, then the process repeats at step 500 and the system continues to monitor the sensors until a threshold is exceeded.

If the lower threshold is exceeded at step 505, then a communication channel between the meter and a head-end system is caused to enter wake up mode at step 510. This allows intervention and communication remotely, in an enhanced manner. Typically, this type of communication is not optimal because it requires additional power which can cost money or drain a battery that powers the meter. Thereafter, at step 515 the enhanced communication channel is used (by an operator or computer-controlled system) to diagnose the problem remotely. Then, the problem is diagnosed or fixed remotely at step 520. Thereafter, the process repeats at step 500.

Figure 6:
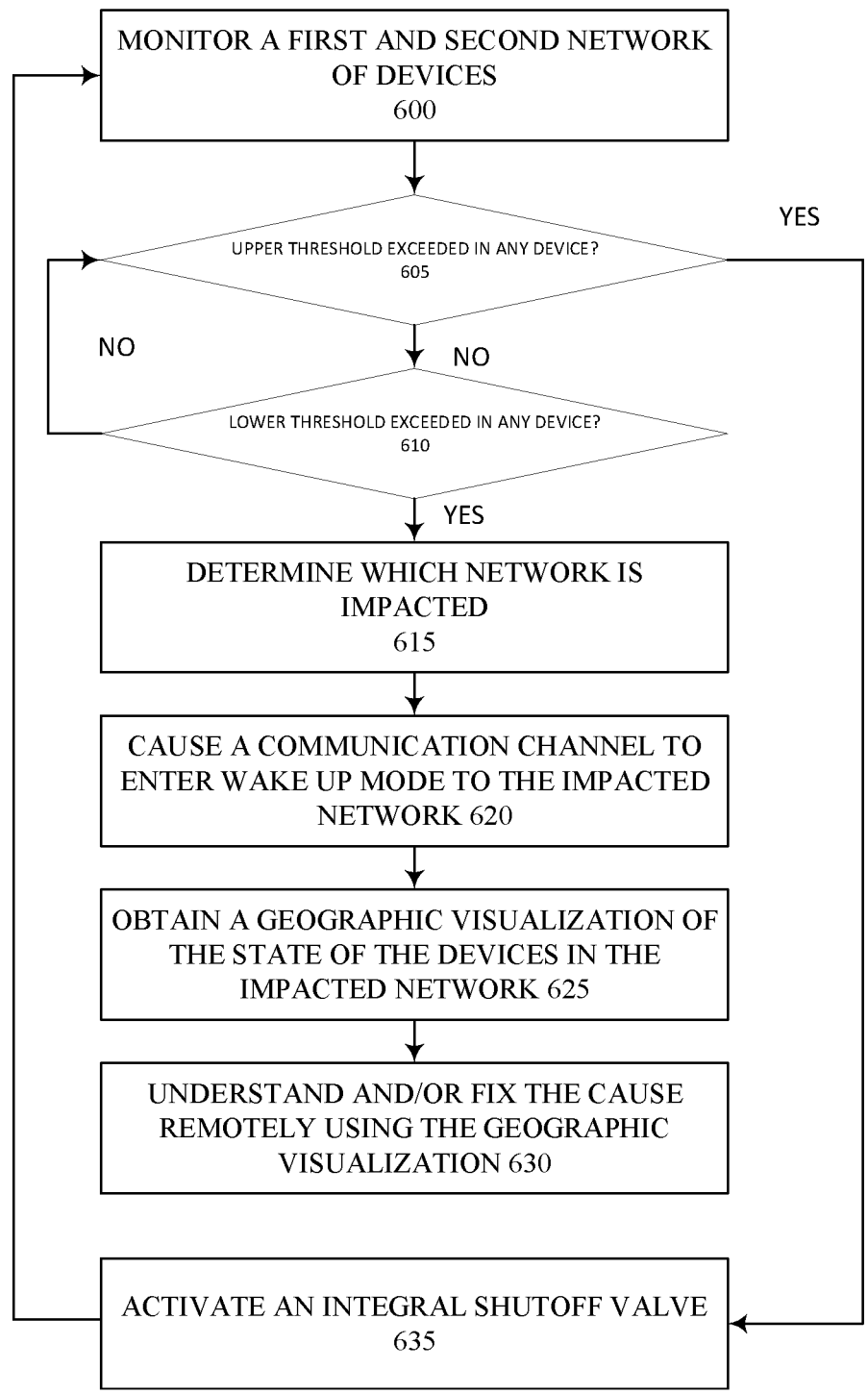
FIG. 6 is a flowchart that illustrates the present use of a two-phase shutoff of the device.

FIG. 6 is a flowchart that illustrates the present use of a two-phase shutoff of a device having a sensor coupled to an integral shutoff system. At step 600, a first and second network of devices are monitored. This could be performed, for example, by a head-end system configured to monitor the network. When the head end system detects that an upper threshold has been exceeded at step 605, an integral shutoff valve is activated at step 635. One scenario where this might happen is when a gas line exceeds a maximum pressure reading, indicating a higher risk of damage to the system. By shutting the valve at step 635 it gives the operator of the head-end system time to go to the location of the faulty meter in order to fix the problem manually.

If, on the other hand, the upper threshold is not exceeded at step 605, the system determines whether a lower threshold has been exceeded at step 610. If not, the process repeats at step 605 where the system continues to monitor until one of the thresholds is exceeded. When the lower threshold is exceeded the head-end determines which network of devices is impacted at step 615 and wakes up a communication channel at step 620 between the head-end and the impacted network of devices. At step 625 a geographic visualization is obtained that is associated with the impacted network of devices. This could include, for example, the status of each device in the network, its location, how it connects to the other devices in the network, and the readings of the sensors for each of these devices. At step 630, the geographic visualization is used to diagnose and/or fix the remotely in the impacted network. Thereafter, the process repeats at step 600.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A two-phase shutoff system, comprising:
a metering system with a sensor coupled to an integral shutoff system, wherein the sensor is used to perform a measurement which indicates a first threshold has been met;
a first response system configured to perform at least one action with respect to receiving the indication the first threshold was met, the first threshold indicates a lower of two thresholds, the at least one action occurring while the integral shutoff system remains inactivated to allow the two-phase shutoff system to correct any abnormality without shutting off the line;
a second response system configured to receive an indication from the metering system, wherein the sensor is used to perform a second measurement which indicates a second threshold has been met, the second threshold indicates a higher threshold of the two thresholds; and
the second response system configured to perform at least one additional action, wherein the at least one additional action includes activating the integral shutoff system.

2. The system of claim 1 wherein the sensor is a pressure sensor.

3. The system of claim 1 wherein the integral shutoff system is a shut off valve.

4. The system of claim 1 wherein the at least one action comprises entering an enhanced communication mode.

5. The system of claim 1 wherein the at least one action comprises using the measurement from the sensor and a second measurement from a second sensor of second device, wherein the second device is in a computer network with a first device.

6. The system of claim 1 wherein the at least one action comprises making a determination regarding the measurement and thereafter activating the integral shutoff system of a device.

7. One or more hardware-based non-transitory memory devices storing computer-readable instructions which, when executed by the one or more processors disposed in a computing device, cause the computing device to:
receive an indication from a first network of devices, wherein at least one sensor in the network of devices performed a measurement and indicated a first threshold has been met, the first threshold indicates a lower of two thresholds, the network of devices including at least one first integral shutoff system;
receive an indication from a second network of devices, wherein at least one second sensor in the second network of devices performed a second measurement and indicated a second threshold has been met, the second threshold indicates a higher threshold of the two thresholds, the second network of devices including at least one second integral shutoff system;
perform at least one action with respect to the first and second networks, the at least one action occurring while the first and second integral shutoff system remains inactivated to allow the computing device to correct any abnormality without shutting off the line, the at least one first and second sensors are different sensors and the first and second measurements are different types of measurements;
receive a subsequent indication from the first network of devices, wherein the at least one sensor is used to perform a subsequent measurement and indicated an additional threshold has been met, the additional threshold being associated with the first threshold; and
receive a subsequent indication from the second network of devices, wherein the at least one second sensor is used to perform a subsequent second measurement and indicated a second additional threshold has been met, the second additional threshold being associated with the second threshold; and
perform at least one additional action with respect to the first and second network of devices, wherein the at least one additional action includes activating one or more of the first integral shutoff system and the second integral shutoff system.

8. The one or more hardware-based non-transitory memory devices of claim 7 wherein the at least one first sensors are associated with a gas line and the at least one second sensors are associated with an electrical line.

9. The one or more hardware-based non-transitory memory devices of claim 7 wherein the at least one action or the at least one additional action comprises entering an enhanced communication mode.

10. The one or more hardware-based non-transitory memory devices of claim 7 wherein the at least one action or the at least one additional action comprises making a determination regarding the measurement or the second measurement and thereafter activating the first or the second integral shutoff systems.

11. The one or more hardware-based non-transitory memory devices of 7 wherein the first network of devices are battery powered.

12. The one or more hardware-based non-transitory memory devices of 7 wherein the second network of devices are electrically powered.

13. The one or more hardware-based non-transitory memory devices of 7 wherein the at least one action or the at least one additional action comprises obtaining a geographic visualization associated with the first or the second network of devices.

14. The one or more hardware-based non-transitory memory devices of 7 further comprising using a geographic visualization to avoid activating the first or the second integral shutoff systems.

15. A method for a two-phase shutoff of a device having a sensor coupled to an integral shutoff system, comprising:
receiving an indication from the device, wherein the sensor is used to perform a measurement in the device which indicates a first threshold has been met;
performing at least one action with respect to receiving the indication the first threshold was met, the first threshold indicates a lower of two thresholds, the at least one action occurring while the integral shutoff system remains inactivated to allow the two-phase shutoff system to correct any abnormality without shutting off the line;
receiving an indication from the device, wherein the sensor is used to perform a second measurement in the device which indicates a second threshold has been met, the second threshold indicates a higher threshold of the two thresholds; and
performing at least one additional action, wherein the at least one additional action includes activating the integral shutoff system of the device.

16. The method of claim 15 wherein the sensor is a pressure sensor.

17. The method of claim 15 wherein the integral shutoff system is a shut off valve.

18. The method of claim 15 wherein the at least one action comprises entering an enhanced communication mode.

19. The method of claim 15 wherein the at least one action comprises using the measurement from the sensor and a second measurement from a second sensor of second device, wherein the second device is in a computer network with a first device.

20. The method of claim 15 wherein the at least one action comprises making a determination regarding the measurement and thereafter activating the integral shutoff system of the device.

\* \* \* \* \*